2,723,988

PURIFICATION OF CRUDE FOOTS OIL OXIDATES

John Walter Nelson, Lansing, Ill., assignor to Sinclair Refining Company, New York, N. Y., a corporation of Maine No Drawing. Application February 16, 1954,
Serial No. 410,711

2 Claims. (Cl. 260—452)

My invention relates to the purification of crude oxidates of foots oil fractions obtained from the separation of the waxy components of petroleum and in particular, to a novel method of purifying the crude oxidates by filtration, water washing and steam stripping.

In the oxidation of a foots oil fraction, to produce fatty acids, for example, the foots oil is subjected to large amounts of air at an elevated temperature for about 20 hours or more in the presence of a manganese and alkali metal containing oxidation catalyst, for example, potassium permanganate. In the product are found mono- and di-basic acids, hydroxy acids, normal esters, lactones, lactides, alcohols, ketones, carbon dioxide, carbon monoxide, water and some unreacted hydrocarbons. Also, due to the varying molecular weight of the feed stocks, and to their cleavage during oxidation, all of the organic compounds above occur within a wide range of molecular weights. During the course of the reaction the low molecular weight volatile organic compounds, and carbon monoxide, carbon dioxide and water are collected overhead. Thus, except for trace amounts, they are not present in the solid reaction product.

The crude oxidate, however, contains impurities in the form of inorganic compounds formed by the catalyst and low molecular weight corrosive acids and often has an undesirable odor and color. The oxidates have particular value as rust inhibitors for distillate fuels. For this use, however, it is desirable to remove corrosive acids and also desirable that the oxidate have good odor and color. The presence of the corrosive acids necessitates the use of larger concentrations of oxidate and also makes the oxidate a less effective corrosion inhibitor. The amount of crude oxidate used must be controlled so that the concentration of corrosive acids does not become excessive. The recovery of the dibasic acids in the oxidates is particularly desired. Oxidates can be purified by treatment with mineral acid and water and also by distillation and solvent extraction procedures. The distillation procedure is costly, however, because of the extremely low vapor pressure of high molecular weight acids and the solvent extraction procedure is costly because of the cost of the solvent.

I have found that crude oxidates of foots oil fractions are effectively and economically purified by filtering the crude oxidate, washing the filtered oxidate with controlled amounts of water containing hydrochloric acid and stripping the filtered and washed oxidate with steam at a particular temperature. I have found that in order to obtain a satisfactory product, the combination of the three steps of filtering, water washing and steam stripping is required and, moreover, the steps are required in this particular order. By the method of my invention, odoriferous compounds are removed or substantially reduced, corrosive compounds are removed and product color is improved while high yields of purified oxidate of constant acid and saponification number and of high dibasic acids content are obtained. Thus, a product is obtained which can be used in smaller concentrations than the crude oxidate and yet provides safe, effective corrosion inhibition.

According to the method of my invention, a crude oxidate of a foots oil fraction is filtered to remove inorganic compounds formed by the catalyst. I have found that filtering prior to washing and steam stripping improves product color and lowers manganese content. The reduction of manganese content is important in that I have found that the presence of manganese has a deleterious effect on product color during the steam stripping step.

The filtered oxidate is then washed with water, which removes soluble organic compounds and low molecular weight corrosive acids. Water is used in an amount at least about 60 per cent of the weight of the oxidate. The oxidate may be washed with the total amount of water or may be washed in separate steps with portions of the total amount of water, for example, two water washes with a water to oxidate ratio of about 0.33 to 0.5:1 may be used. When water is used alone, however, a long settling time is required to obtain a clean acids-water break. I have found that the use of a small amount of hydrochloric acid in the water substantially shortens the required settling time, for example, from about 16 hours to about 15 minutes. The hydrochloric acid, preferably in concentrated form, is used in amounts of about 0.5 to 1 weight per cent based on the weight of the oxidate. At least about 0.5 weight per cent is required to remove all manganese in a settling time of about 15 minutes.

The filtered and washed oxidate is then stripped with steam, which improves the product odor and also removes low molecular weight corrosive acids not removed by the water washing step. I have found that steam stripping substantially improves product odor over additional water washing. The temperature of the steam stripping is about 225 to 275° F. and preferably about 250° F. Higher temperatures may be used and greater reduction in saponification number is obtained thereby, but product color is deleteriously affected by such temperatures. For example, steam stripping of a filtered, washed foots oil oxidate at 250° F. with steam in an amount of about one and one half times the weight of oxidate produced a product having an NPA color of 4.5 and reduced the saponification number by 6 to 11 while steam stripping at 300° F. produced a product having an NPA color of 6 and reduced the saponification number by 24 to 27. The amount of steam used is about one to one and one half times the weight of the oxidate. Greater amounts of steam may be used but have little effect in lowering the saponification number of the oxidate. After steam stripping the products are agitated at about 250° F. for about 30 minutes to remove residual water. The products have good odor and color and are of constant saponification and acid number.

An illustration of the effectiveness of my method of purification is the following typical analytical data showing, after each step in the method, the drop in saponification number, acid number and manganese content. A crude foots oil oxidate having a saponification number of 310, an acid number of 190 and a manganese content of approximately 0.1 per cent was reduced to a saponification number of 300, an acid number of 185 and a manganese content of approximately 0.01 per cent after filtration, to a saponification number of 235, an acid number of 145 and a manganese content of 0.000 after water washing and a saponification number of 225, an acid number of 130 and no manganese content after steam stripping.

The oxidates purified by the method of my invention are those obtained by the oxidation of foots oil fractions obtained from solvent deoiling or sweating of wax, e. g. slack wax. The foots oil fractions useful for oxidation to produce oxidates having the combination of desirable properties of a good rust inhibitor, i. e., high saponification and acid number, low pour point, relatively light color and good oil solubility, are characterized by a melting point within the range of about 80 to 120° F., an oil content of about 4 to 30 per cent and an API gravity of about 30 to 45. The foots oil fractions obtained from the sweating of wax can be the liquid fraction separated from the first sweating of slack wax operation or the liquid separated from re-sweating the liquid from the first sweating or any liquid from further re-sweatings having the above characteristics. A foots oil fraction obtained by deoiling slack wax with methylethyl ketone, for example, single deoiling slack wax of a viscosity of about 60 to 70 Saybolt universal seconds at 210° F., is a particularly advantageous starting material, although a fraction produced by double deoiling is also satisfactory.

The foots oil oxidates are prepared by oxidizing a foots oil fraction by subjecting the foots oil to large amounts of air or oxygen at an elevated temperature, i. e., above about 250° F., in the presence of about 0.2 to 1.7 weight per cent of an oxidation catalyst, e. g. potassium permanganate, for a period of time sufficient to effect substantially complete oxidation of the foots oil. For example, a foots oil fraction obtained as described above and having a melting point of about 80 to 120° F., an oil content of about 4 to 30 per cent and an API gravity of about 30 to 45 is oxidized with oxygen in the presence of potassium permanganate. The reaction is carried out at about 250 to 300° F. with, for example, about 165 liters of oxygen per kilogram of foots oil per hour using about 0.85 per cent by weight of potassium permanganate. The reaction is continued until the oxidation is substantially complete, for example, until the reaction mixture has a saponification number of about 250 to 300.

The crude foots oil oxidates are characterized by a relatively low melting point within the range of about 80 to 95° F., an API gravity of about 10 to 25 and a saponification number of about 250 to 325. When purified, the oxidates have a saponification number of about 200 to 250. Similarly, the acid number of the crude oxidate is reduced from about 150 to 200 to about 100 to 150 for the purified oxidate. The oxidates are waxy solids that are light amber to brown in color and are characterized by improved stability, good oil solubility and good rust inhibiting properties.

The method of my invention will be further illustrated by the following examples.

Example I

Oxidates of foots oil fractions obtained from slack wax were purified by the steps of filtration, water washing and steam stripping in various sequences.

The oxidates were obtained by the oxidation of foots oil obtained from the solvent deoiling or sweating of slack wax. A representative oxidation procedure is as follows: 2,000 grams of a foots oil fraction were charged into a reactor flask. The foots oil fraction had a saponification and acid number of 0, an $I_2$ number of 5.5, 22.62 per cent oil, an API gravity of 36.1 and a pour point of 105° F. The foots oil was heated and then about 0.85 weight per cent of "seed," a product from a previous reaction, was added. The mixture was then heated to 300 to 325° F. while stirring. Meanwhile, 0.85 weight per cent of potassium permanganate was dissolved in five times its weight of warm water. This catalyst solution at about 150 to 170° F. was added dropwise to the agitating foots oil and seed. The water was flashed off during the catalyst addition. Oxygen at the rate of 165 liters per hour per kilogram of foots oil was then introduced for 32.75 hours. When overhead started to form and the temperature rose, the flask was cooled to the run temperature of 250 to 260° F. This temperature was maintained until the saponification number of the product was approximately 300. The reaction started from 1 to 30 minutes after the introduction of the oxygen. 1802 grams of oxidate were recovered. The product had a saponification number of 293.5, an acid number of 182.2, an $I_2$ number of 7, an API gravity of 14, a pour point of 95° F., 14.82 per cent unsaponifiables, and an NPA color of 4.

The results of the various sequences of purification steps in the purification of foots oil oxidates are tabulated below. The numerals indicate the order of the steps.

| Run No. | Filtration | Water Washing [1] | Steam Stripping | Percent Mn | Color [2] |
|---|---|---|---|---|---|
| 1 | | | | 0.0625 | Light. |
| 2 | 1 | | | 0.0030 | Do. |
| 3 | 1 | 2 | | 0.0000 | Medium. |
| 4 | 1 | | 2 (250° F.) | 0.0013 | Do. |
| 5 | 1 | 2 | 3 (300° F.) | 0.0000 | Medium Light. |
| 6 | 1 | 3 | 2 (300° F.) | Trace | Medium. |
| 7 | 2 | 3 | 1 (250° F.) | Trace | Do. |
| 8 | 2 | | 1 (250° F.) | 0.0035 | Dark. |
| 9 | | | 1 (250° F.) | 0.0067 | Do. |
| 10 | | 1 | | Trace | Medium. |
| 11 | | 1 | 2 (250° F.) | Trace | Dark. |

[1] 1:1 water:oxidate wash.
[2] Colors ranged from NPA 2.5 to 6.5. The light color of the crude oxidate is due to manganese salts.

The results show that filtration alone is insufficient to remove all the manganese (runs 1 and 2). Filtration followed by water washing, however, succeeds in removing all manganese (run 3). Since more than a trace of manganese has a deleterious effect, filtration and steam stripping is unsatisfactory (run 4). The sequence of filtration, water washing and steam stripping, however, is the best purification sequence in terms of color and manganese content (run 5). The deleterious effect of the presence of manganese on product color during steam stripping is shown in runs 6, 7, 8 and 9 in which steam stripping is used prior to washing and/or filtering. Runs 10 and 11 show that water washing without filtration is insufficient. Moreover, the filtered, washed and steam stripped sample had the best odor while the filtered and filtered-washed sample had the poorest odor.

Thus, by manganese analysis and determination of color, it is demonstrated that the oxidate must be treated by the steps of filtration, water washing and steam stripping and the steps must be used in this sequence to obtain a satisfactory product.

Example II

Filtered foots oil oxidates were washed with various amounts of water and with water containing hydrochloric acid and the effectiveness determined. Oxidate A was a filtered crude oxidate of a saponification number of 290–300 and oxidate B was a filtered crude oxidate having a saponification number of 285 to 292.

| Run No. | Oxidate | $H_2O$:Oxidate | Percent HCl [1] | Settling Time | Sap. No. | Percent Mn |
|---|---|---|---|---|---|---|
| 1 | A | 1:1 | | 16 hrs. | 247 | |
| 2 | A | 0.5:1 twice | | 16 hrs. | 234 | |
| 3 | B | 0.5:1 | 1 | 15 min. | 257 | trace |
| 4 | B | 0.33:1 | 1 | do | 262 | trace |
| 5 | B | 0.33:1 twice | 1 | do | 254 | 0.000 |
| 6 | B | 0.33:1 | 0.5 | do | 254 | trace |
| 7 | B | 0.33:1 twice | 0.5 | do | 238 | 0.000 |
| 8 | B | do | 0.5 | do | 236 | 0.000 |

[1] Based on the oxidate.

The results show that water washing without the use of hydrochloric acid requires a settling time of 16 hours to get a clean water-oxidate break. The use of hydrochloric acid in small amount, however, reduced this time to only 15 minutes. In runs 3 and 4, neither 0.5:1 nor 0.33:1 water washes containing 1 weight per cent hydrochloric acid was enough to remove all the manganese. A second 0.33:1 water wash containing 1 weight per cent hydrochloric acid (run 5), however, does remove all the manganese. In runs 4, 5, and 6 a reduction of hydrochloric acid to 0.5 weight per cent gave the desired result in two 0.33:1 water washes. In these runs, 0.33 weight per cent of hydrochloric acid was tried but a rapid water-oxidate break did not occur while the use of 0.5 per cent gave a separation in 15 minutes.

*Example III*

Rust inhibiting tests were performed using filtered crude foots oil oxidates and purified foots oil oxidates obtained from the crude oxidate by filtering, water-acid washing and steam stripping according to the method of my invention. The tests were performed using gasoline and solutions of the oxidates in an aromatic solvent. The results of the dynamic rust tests are as follows:

|  | Gasoline | |
| --- | --- | --- |
|  | lbs./1,000 bbls. | Rating |
| Filtered Crude Oxidate (35% solution) | 5<br>10<br>30<br>90 | C<br>B+<br>B++<br>B |
| Purified Oxidate (35% solution) | 5<br>10<br>30<br>90 | B<br>B+<br>A<br>A |

The data show that foots oil oxidates purified according to the method of my invention are more efficient gasoline rust inhibitors than filtered crude foots oil oxidates. The data also show that in the case of the purified oxidates excess quantities are not harmful, while the crude product loses its rust inhibiting properties when large amounts are used.

I claim:

1. A method of purifying a crude oxidate of a foots oil fraction which comprises filtering the crude oxidate, washing the filtered oxidate with water containing at least about 0.5 weight per cent of hydrochloric acid based on the weight of the oxidate and in a water to oxidate weight ratio of at least about 0.6 to 1 and stripping the filtered and washed oxidate at a temperature of about 225 to 275° F. with steam in an amount of at least about 100 weight per cent of the weight of the oixdate.

2. A method of purifying a crude oxidate of a foots oil fraction which comprises filtering the crude oxidate, washing the filtered oxidate with water containing about 0.5 to 1 weight per cent of hydrochloric acid based on the weight of the oxidate and in a water to oxidate weight ratio of at least about 0.6 to 1 and stripping the filtered and washed oxidate at a temperature of about 225 to 275° F. with steam in an amount of about 100 to 150 weight per cent of the weight of the oxidate.

References Cited in the file of this patent

UNITED STATES PATENTS

| | | |
| --- | --- | --- |
| 1,782,963 | James | Nov. 25, 1930 |
| 1,828,356 | Burwell | Oct. 20, 1931 |
| 1,871,082 | Pungs | Aug. 9, 1932 |
| 1,987,208 | Peukert | Jan. 8, 1935 |
| 2,052,165 | Carrier et al. | Aug. 25, 1936 |
| 2,356,340 | Murphree | Aug. 22, 1944 |
| 2,682,553 | Kirk et al. | June 29, 1954 |